US006583781B1

United States Patent
Joshi et al.

(10) Patent No.: US 6,583,781 B1
(45) Date of Patent: Jun. 24, 2003

(54) METHODS, SYSTEMS AND COMPUTER PROGRAM PRODUCTS FOR CONTROLLING EVENTS ASSOCIATED WITH USER INTERFACE ELEMENTS BY CAPTURING USER INTENT BASED ON POINTER MOVEMENTS

(75) Inventors: Niraj P. Joshi, Raleigh, NC (US); Mark Edward Molander, Cary, NC (US); John L. Scanlon, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 09/690,205

(22) Filed: Oct. 17, 2000

(51) Int. Cl.[7] .................................................. G09G 5/00
(52) U.S. Cl. ........................ 345/156; 345/157; 345/158; 345/159; 345/160; 345/161; 345/162; 345/163
(58) Field of Search .................................. 345/156–163, 345/167, 856–857, 860, 862; 340/706, 709–711, 825.15

(56) References Cited

U.S. PATENT DOCUMENTS

| 4,698,625 | A | * | 10/1987 | McCaskill et al. | ........... 345/157 |
| 4,935,728 | A | * | 6/1990 | Kley | ........................... 341/31 |
| 5,012,231 | A | | 4/1991 | Felsenstein | ................. 340/709 |
| 5,191,641 | A | * | 3/1993 | Yamamoto et al. | ......... 345/159 |
| 5,367,631 | A | | 11/1994 | Levy | ........................... 395/162 |
| 5,508,717 | A | * | 4/1996 | Miller | ......................... 345/157 |
| 5,635,954 | A | * | 6/1997 | Yamada | ...................... 345/157 |
| 5,661,502 | A | * | 8/1997 | Cheng | ......................... 345/159 |
| 5,786,805 | A | * | 7/1998 | Barry | .......................... 345/159 |
| 5,870,079 | A | * | 2/1999 | Hennessy | ................... 345/157 |
| 5,900,872 | A | * | 5/1999 | Ashe | ........................... 345/157 |
| 6,028,594 | A | | 2/2000 | Inoue | .......................... 345/173 |
| 6,031,531 | A | | 2/2000 | Kimble | ........................ 345/348 |
| 6,052,115 | A | | 4/2000 | Gregg et al. | ................. 345/159 |
| 6,281,879 | B1 | * | 8/2001 | Graham | ...................... 345/157 |
| 6,373,047 | B1 | * | 4/2002 | Adan et al. | ................. 250/221 |

FOREIGN PATENT DOCUMENTS

| JP | 3048922 | 3/1991 | .......... G06F/3/033 |
| JP | 4165416 | 6/1992 | .......... G06F/3/033 |
| JP | 6012185 | 11/1994 | .......... G09G/1/100 |

* cited by examiner

Primary Examiner—Bipin Shalwala
Assistant Examiner—Leonid Shapiro
(74) Attorney, Agent, or Firm—Myers Bigel Sibley & Sajovec, P.A.; Gerald R. Woods, Esq.

(57) ABSTRACT

Methods, systems and computer program products are provide which control events associated with an element of a user interface by determining a characteristic(s) of pointer movement of a pointing device and adjusting a condition(s) for triggering an event associated with the element based on the determined characteristic of pointer movement. The triggering of the event is controlled utilizing the adjusted condition. By determining characteristics of pointer movement, a user's intent may be inferred from that pointer movement and, based on the inferred intent, the conditions for triggering of events may be adjusted consistent with such inferred intent.

24 Claims, 10 Drawing Sheets

METHODS, SYSTEMS AND COMPUTER PROGRAM PRODUCTS FOR CONTROLLING EVENTS ASSOCIATED WITH USER INTERFACE ELEMENTS BY CAPTURING USER INTENT BASED ON POINTER MOVEMENTS

FIELD OF THE INVENTION

The present invention relates to user interfaces and more particularly to the control of events associated with user interfaces.

BACKGROUND OF THE INVENTION

Conventional data processing systems with graphic user interfaces typically utilize a pointing device, such as a mouse, trackball, light pen, tablet or the like, to move a pointer which is displayed on a display of the data processing system. Typically, elements of the graphic user interface, such as buttons, scroll bars, folder or portfolio tabs, hyperlinks, menus or the like, are defined such that selection of these elements results in the triggering of an event. Furthermore, merely moving a pointer onto a region of a display associated with an element may trigger an event.

For example, for a button user interface element, an "enter" event may be triggered when the pointing device is placed within the bounds of the button. The enter event may be utilized in various ways, however, one use of the enter event is to initiate a timer. Upon expiration of the timer, a tool tip or other pop-up graphic is displayed to the user. Typically, such a timer is a fixed value and the tool tip is displayed after a predefined time of pointer inactivity after the enter event has been triggered. Thus, after the timer expires, an "activate" event may be triggered to display the tool tip. After another timer expires, a "deactivate" event may be triggered to terminate display of the tool tip. Finally, an "exit" event may be triggered when the pointing device is moved outside the bounds of the button.

As described above, the triggering of events may result in changes to the user interface or other such actions being taken. These events typically have a fixed relationship to pointer positioning on a display. In other words, the events are typically either triggered immediately upon the pointer being in a particular location or they are triggered by the pointer being in a location for a fixed delay period.

For example, as the pointer is moved across the display, events may be triggered immediately upon pointer movement. This may result in the display of unwanted information, such as tool tips which are not of interest, or may result in unintended events occurring based on minor pointer movements. For example, when the pointer is placed over a resize element of a display, the pointer icon may change from an arrow to a double-ended arrow to indicate that the pointer performs the resizing function. This change may be immediate upon the pointer entering the resize element and then change back to the arrow immediately upon exiting the resize element. Such changes may be distracting to the user if the user does not want to perform the resize operation.

A further example may be seen in a user interface which has a portfolio paradigm where information is organized and displayed in "portfolios" which are windows or frames of, often related, information or elements. In such portfolio paradigms, the whole portfolio typically may be "maximized" or restored from a minimized setting by positioning the pointing device on a "tab" for the portfolio. When the pointing device enters the tab element, the portfolio is maximized or restored to the previous display size. The user may then view or manipulate the information in the portfolio. When the user moves the pointer outside the portfolio, the portfolio may immediately minimize and return to only displaying the "tab" representation of the portfolio. Difficulties may occur, however, if user interface elements are placed at the edges of the portfolio as a user may "overshoot" the element and move the pointer outside the portfolio. The portfolio would then minimize and the user would need to restore the portfolio to perform the desired operation.

A similar difficulty may be associated with the task bar in Windows98® from Microsoft Corporation, Redmond, WA. The task bar of Windows98® may be hidden such that when the pointing device is moved to the edge of the display where the task bar is hidden the task bar is displayed. When the pointer is moved off of the task bar, the task bar is hidden. A user may inadvertently move the pointer off of the task bar causing the task bar to hide, thus, requiring the user to move the pointer to the edge of the display to re-display the task bar. Such unintended consequences of pointer movement may be frustrating to the users and, therefore, may reduce to overall effectiveness of the user interface.

SUMMARY OF THE INVENTION

Embodiments of the present invention include methods, systems and computer program products which provide for controlling events associated with an element of a user interface by determining a characteristic(s) of pointer movement of a pointing device and adjusting a condition(s) for triggering an event associated with the element based on the determined characteristic of pointer movement. The triggering of the event is controlled utilizing the adjusted condition. Thus, by determining characteristics of pointer movement, a user's intent may be inferred from that pointer movement and, based on the inferred intent, the conditions for triggering of events may be adjusted consistent with such inferred intent.

In particular embodiments of the present invention, the condition which is adjusted may be a timing associated with triggering the event. In further embodiments, the characteristic evaluated may be direction of movement of the pointer, direction of movement of the pointer with relation to the element, speed of movement of the pointer and/or acceleration of movement of the pointer.

In still further embodiments of the present invention, a region of a display associated with the element is defined. It is determined if the pointer is within the defined region. The determination of the characteristic(s) of pointer movement is carried out if the pointer is within the defined region.

In particular embodiments of the present invention, the characteristic(s) is determined and the condition(s) is adjusted by determining a direction of movement of the pointer, determining if the direction of movement of the pointer is toward the element, determining a speed of the pointer and determining an acceleration of the pointer. A delay associated with triggering the event is reduced if the direction of movement is toward the element, the speed is below a predefined threshold and the acceleration of the pointer indicates that the pointer is decelerating.

In such embodiments, the event may be displaying a tool tip, restoration of a graphic user interface display window, maximization of a graphic user interface display window, selection of the element, placing focus on the element or change of a graphic representation of the pointer.

Furthermore, the determination of a direction of movement of the pointer, determination of a speed of the pointer and determination of an acceleration of the pointer may only be carried out if the direction of movement of the pointer is toward the element, the speed of the pointer is below the predefined threshold or the acceleration of the pointer is decelerating.

In particular embodiments, the determination of the speed of the pointer is only carried out if the direction of movement of the pointer is toward the element and the determination of an acceleration of the pointer is only carried out if the speed of the pointer is below the predefined threshold. In still further embodiments of the present invention, a region of a display associated with the element is defined and the determination of a direction of movement of the pointer, a speed of the pointer and an acceleration of the pointer are only carried out if the pointer is within the defined region.

In still additional embodiments of the present invention, the determination of a characteristic(s) and adjusting of a condition(s) may be provided by determining a direction of movement of the pointer, determining if the direction of movement of the pointer is away from the element, determining a speed of the pointer, and determining an acceleration of the pointer. A delay associated with triggering the event is increased if the direction of movement is away from the element, the speed is below a predefined threshold and the acceleration of the pointer indicates that the pointer is decelerating. In such embodiments, the event may be closing a graphic user interface display window and the element may be a close selection button.

Furthermore, the determination of a direction of movement of the pointer, a speed of the pointer or an acceleration of the pointer may only be carried out if one or more of the direction of movement of the pointer is away from the element, the speed of the pointer is below the predefined threshold or the acceleration of the pointer is decelerating. In particular embodiments, the determination of the speed of the pointer is only carried out if the direction of movement of the pointer is away from the element and the determination of the acceleration of the pointer is only carried out if the speed of the pointer is below the predefined threshold. Additionally, a region of a display associated with the element may be defined and the determination of a direction of movement of the pointer, a speed of the pointer and an acceleration of the pointer may be carried out only if the pointer is within the defined region.

In still further embodiments of the present invention, the characteristic is speed and the adjusting of a condition may include preventing resetting of a timer associated with triggering the event if the speed of movement of the pointing device is greater than zero and less than a predefined threshold speed.

In additional embodiments of the present invention, the adjustment of a condition(s) for triggering an event associated with the element based on the determined characteristic of pointer movement is provided by evaluating the characteristic of pointer movement based on a predefined evaluation criteria and adjusting the condition if the predefined evaluation criteria is met. Furthermore, pointer movement may be tracked so as to establish a history of pointer movement. The predefined evaluation criteria may also be revised based on the history of pointer movement so as to dynamically update the predefined evaluation criteria based on the history of pointer movement. Alternatively, the predefined evaluation criteria may also be adjusted based on characteristics of the user interface element, such as the size, shape and location of the user interface element on the display.

In still further embodiments, the condition may be adjusted proportional to the determined characteristic of pointer movement.

While the invention has been described above primarily with respect to the method aspects of the invention, both systems and/or computer program products are also provided.

DETAILED DESCRIPTION OF PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As described in more detail below, the present invention provides for control of events associated with elements of a user interface, such as a graphic user interface, based on one or more characteristics of pointer movements. These characteristics of pointer movements may be utilized to infer intent of a user and, thereby, control the triggering events consistent with such inferred intent. Thus, for example, the speed and direction of pointer movement may be utilized to infer that a user intends to stop pointer movement on a user interface element. Alternatively, pointer movement characteristics may be used to disregard pointer movement, such as movement off of a user interface element which, based on the pointer movement characteristics is determined to be unintended. Accordingly, embodiments of the present invention may utilize characteristics of pointer movement to modify actions as a result of such movement based on an inferred intent derived from the characteristics of pointer movement.

The present invention is described herein with reference to "events" and "triggers," however, these terms are used in a general sense and are not intended to refer to any specific methodology of handling pointer movements. Thus, the term "event" is used herein to refer to actions resulting from pointer movement. Furthermore, the term "trigger" is used herein to refer to the conditions which are to be met before the "event" takes place. The term "user interface element" is used herein to refer to aspects of a user interface which have events associated therewith. A user interface element may be displayed or non-displayed.

Figure 1:
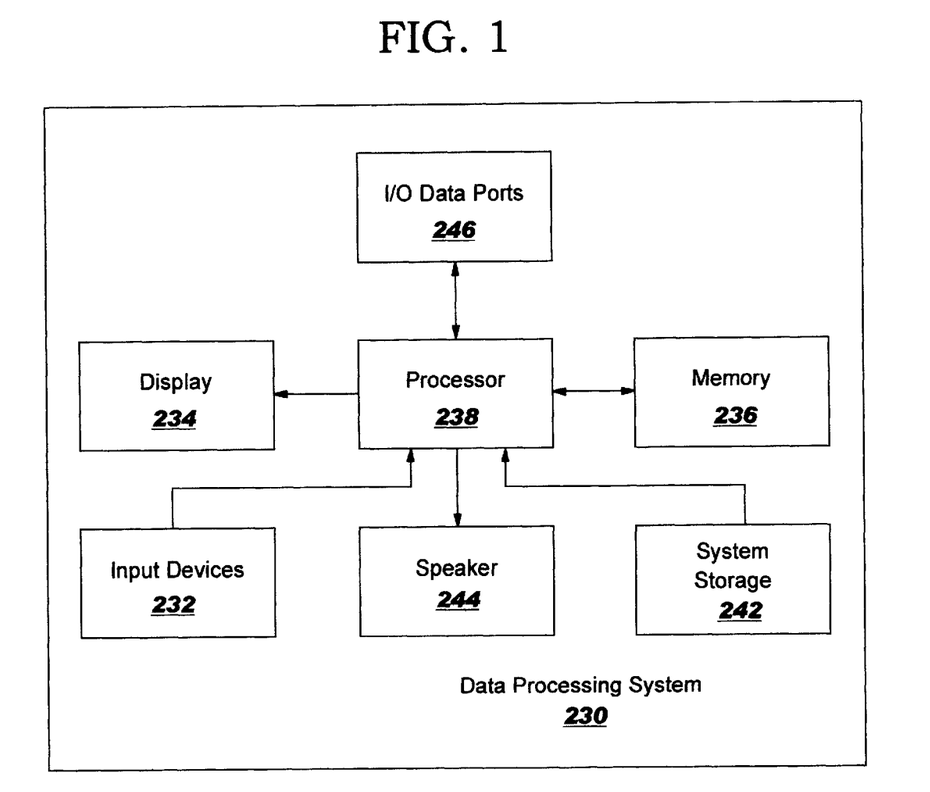
FIG. 1 is a block diagram of data processing systems according to embodiments of the present invention.

The present invention will now be further described with reference to the block diagram of FIG. 1 which illustrates data processing systems according to embodiments of the present invention. As illustrated in FIG. 1, the system 230 may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port(s) 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 2:
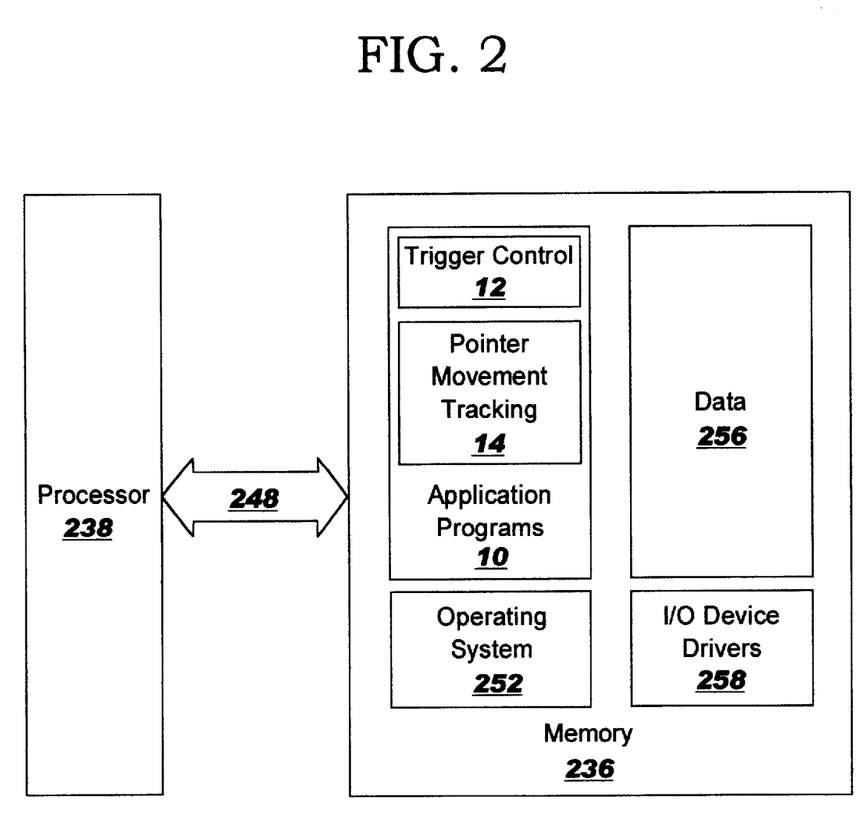
FIG. 2 is a more detailed block diagram of data processing systems according to embodiments of the present invention.

FIG. 2 is a block diagram of a data processing system that illustrates systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 2, the memory 236 may contain several categories of software and data used in the data processing system 230: the operating system 252; the application program(s) 10; the input/output (I/O) device drivers 258; and the data 256. As will be appreciated by those of skill in the art, the operating system 252 may be any operating system suitable for use with a data processing system, such as OS/2, AIX or OS/390 from International Business Machines Corporation, Armonk, N.Y. WindowsCE, WindowsNT, Windows95, Windows98 or Windows2000 from Microsoft Corporation, Redmond, Wash. PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 by the application program(s) 10 to communicate with devices such as the input devices 232, the display 234, the speaker 244, the storage system 242, the I/O data port(s) 246, and certain memory 236 components. The application program 10 is illustrative of the programs that implement the various features of the data processing system 230. Finally, the data 256 represents the static and dynamic data used by the application program 10, operating system 252, I/O device drivers 258, and other software programs that may reside in the memory 236.

As shown in FIG. 2 embodiments of the present invention may include program code which, when executed on a data processing system, provides a trigger control circuit 12 and a pointer movement tracking circuit 14 in the application program(s) 10. The trigger control circuit 12, as illustrated in FIG. 2, controls when events for a user interface element are triggered. The pointer movement tracking circuit 14 tracks pointer movement. The trigger control circuit 12 receives information about characteristic(s) of pointer movement, such as direction, speed and acceleration or the like, from the pointer movement tracking circuit 14. Operations of the trigger control circuit 12 and the pointer movement tracking circuit 14 are described in further detail below.

As will be appreciated by those of skill in the art, while the pointer movement tracking circuit 14 and the trigger control circuit 12 are illustrated as incorporated into one or more application programs 10, the operations and functions performed by such circuits may be incorporated in other aspects of the data processing system, such as the operating system 252 or the I/O device drivers 258. Furthermore, the operations and functions of the trigger control circuit and the pointer movement tracking circuit 14 may be provided as a stand-alone application, an operating system extension, such as a kernel, or as a plug-in or other such enhancement to an application, such as a web browser or Java Virtual Machine. Accordingly, the present invention should not be construed as limited to the division of functions illustrated in FIG. 2 but is intended to encompass any system which may perform the operations described herein.

Figure 3:
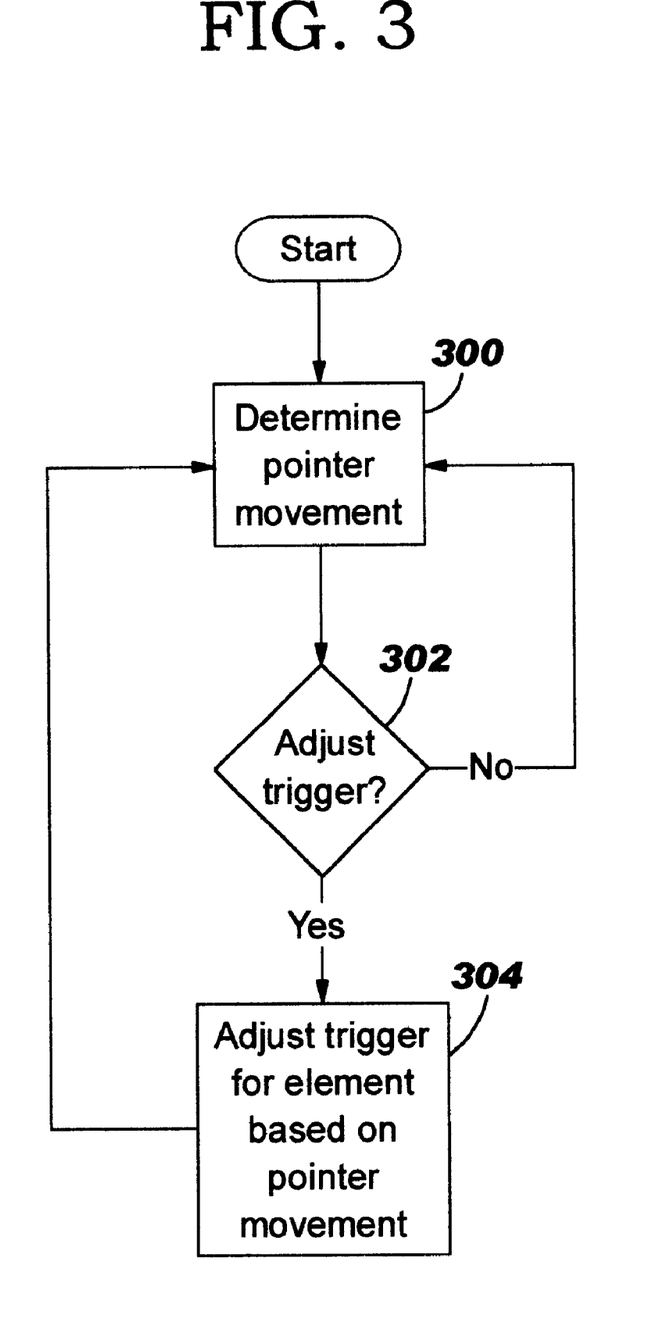
FIG. 3 is a flowchart illustrating operations according to embodiments of the present invention.

Operations according to various embodiments of the present invention for controlling events associated with user interface elements will now be further described with reference to the flowchart illustrations of FIGS. 3, 5 and 7. As seen in FIG. 3, one or more characteristics of pointer movement are determined (block 300). In particular embodiments of the present invention, the determination of pointer movement characteristics may be made by the pointer movement tracking circuit 14 of FIG. 2. Based on the determined characteristic or characteristics of pointer movement, it is determined if the conditions which trigger an event associated with a user interface element are to be adjusted (block 302). If the characteristics of pointer movement indicate that the trigger conditions are to be adjusted, then the trigger conditions are adjusted based on the determined characteristics (block 304). These adjusted trigger conditions may be utilized, for example, by the trigger control circuit 12, to control the triggering of the event associated with the element.

The determination of whether to adjust trigger conditions may be made based on one or more movement characteristics such as, for example, direction of movement (either absolute or relative to an element), speed of movement or acceleration of the pointer, or distance traveled without interruption. These movements may be utilized, for example, to increase or decrease delays associated with triggering of an event. Such delays may be incrementally modified based on thresholds of characteristics or may be proportionally modified based on such characteristics.

Figure 4A:
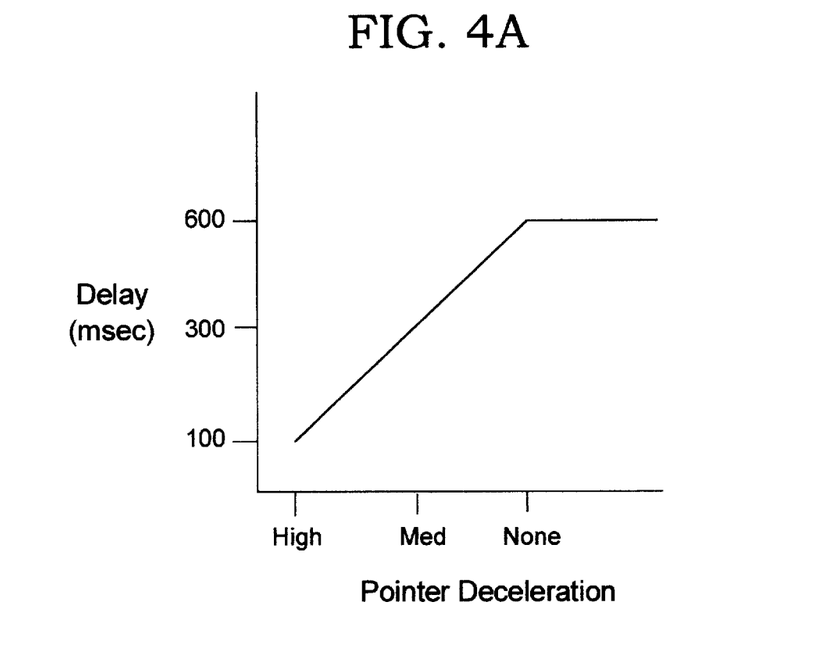
FIG. 4A is a graph of timer delay vs. pointer deceleration which may be utilized in embodiments of the present invention.
Figure 4B:
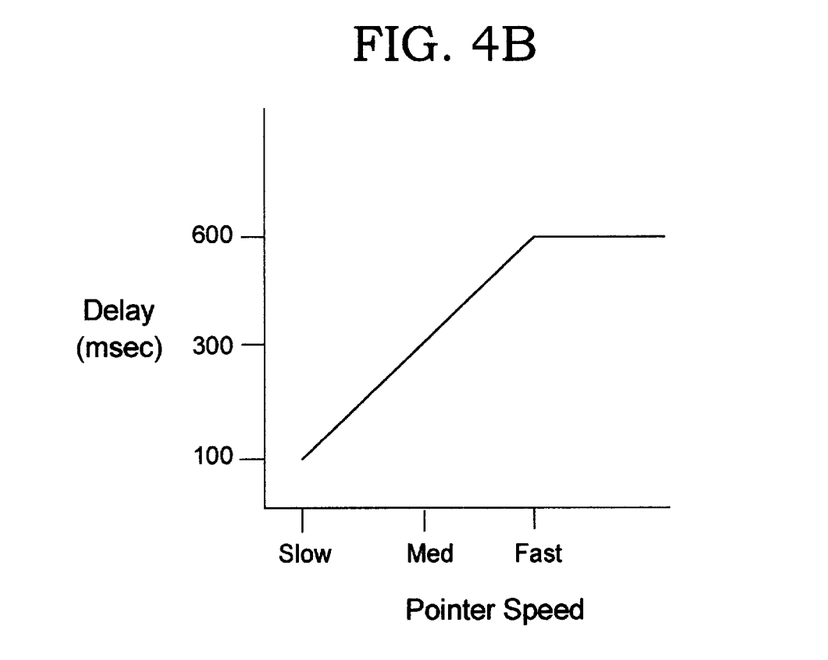
FIG. 4B is a graph of timer delay vs. pointer speed which may be utilized in embodiments of the present invention.
Figure 4C:
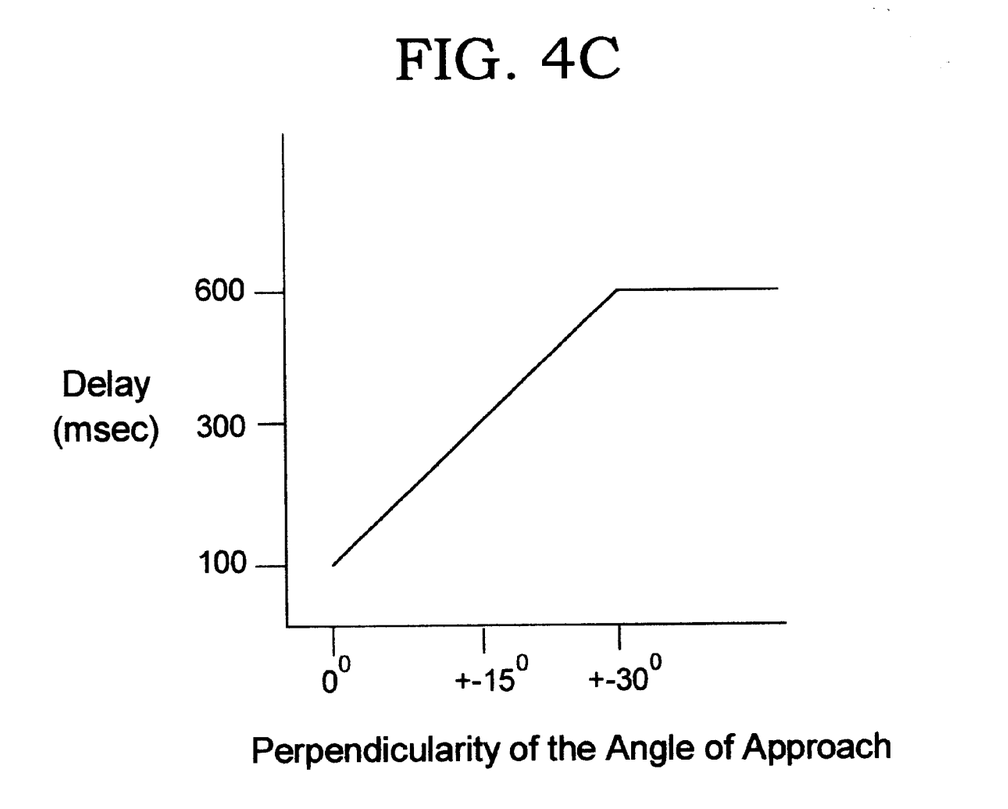
FIG. 4C is a graph of timer delay vs. pointer directness of approach to an element which may be utilized in embodiments of the present invention.

As an example, a delay in displaying a tool tip may be decreased based on one or more of the characteristics as illustrated in FIGS. 4A through 4C. FIG. 4A is an example of varying delay based on rate of deceleration. If the user is slowing down the pointer when approaching a potential target, then the user is more likely to be slowing down to stop the pointer over the target to select it. Therefore, the higher the deceleration, the more the activation delay period may be decreased.

FIG. 4B illustrates an example of varying delay based on pointer speed. If the user is slowly moving the mouse pointer when near a potential target, then the user may be more likely to stop the pointer over the target to select it. Therefore, the slower the pointer speed, the more the activation delay period may be decreased.

FIG. 4C illustrates an example of changing delay based on perpendicularity (directness) of the angle of approach of the pointer to the target. If the user is moving the mouse pointer directly toward a potential target, then the user is more likely to be trying to select it. Therefore, the more perpendicular (direct) the pointer movement is toward the potential target, the more the activation delay period may be decreased.

Because the three characteristics above are likely to be highly correlated, these variables could be combined together in determining the delay. For example, if 2 or 3 of these characteristics were indicating the user's intent to hover over a user interface element, then the delay might be reduced more than if only one of the three measures was indicating user intent.

Figure 5:
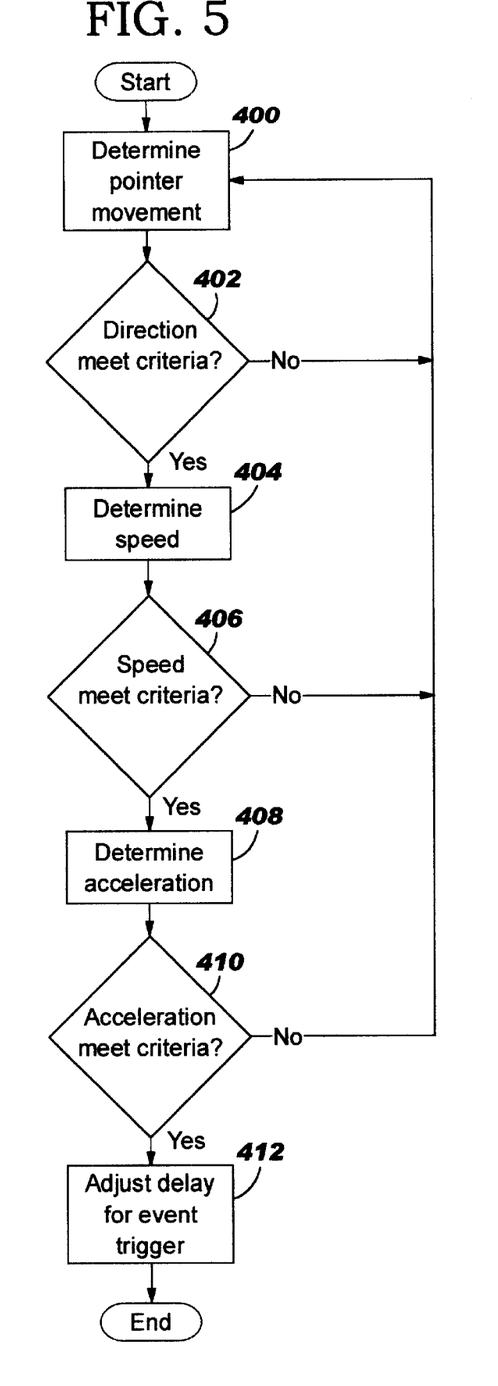
FIG. 5 is a flowchart illustrating operations according to embodiments the present invention.

FIG. 5 is a flowchart illustrating operations according to embodiments of the present invention where multiple characteristics are utilized to determine if the conditions for triggering an event are to be modified. In the embodiments illustrated in FIG. 5, the condition adjusted is a delay associated with the triggering of an event. As seen in FIG. 5, the pointer movement is determined (block 400). Based on the pointer movement, the direction of pointer movement may be determined and compared to a criteria (block 402). For example, the criteria may be met if the pointer is moving toward a user interface element and not met if the pointer is moving away from a user interface element. If the pointer is not moving toward the user interface element, then the criteria is not met and no change to the delay is made (block 402).

If the direction criteria is met, the speed of movement may be determined (block 404) and it is determined if the speed of movement meets a speed criteria (block 406). For example, if the speed of movement is less than a predefined speed threshold, it may be determined that the speed criteria is met. If the speed criteria is not met (block 406), then no change to the delay is made. If the speed criteria is met (block 406), the acceleration of the pointer may be determined (block 408). The acceleration may be compared to an acceleration criteria (block 410) such that no change to the delay is made if the acceleration criteria is not met. If the acceleration criteria is met (block 410), then the delay may be adjusted (block 412). For example, it may be determined if the pointer is decelerating as it moves. If so, then the delay may be reduced to trigger the event sooner.

While the embodiments of FIG. 5 have been described with reference to adjusting a delay by reducing the delay, embodiments of the present invention may also include increasing delays or other modifications as to conditions for triggering events. The particular modifications may differ depending on the user interface element associated with the event and the particular movement characteristics utilized to infer the intent of a user based on pointer movements.

Figure 6A:
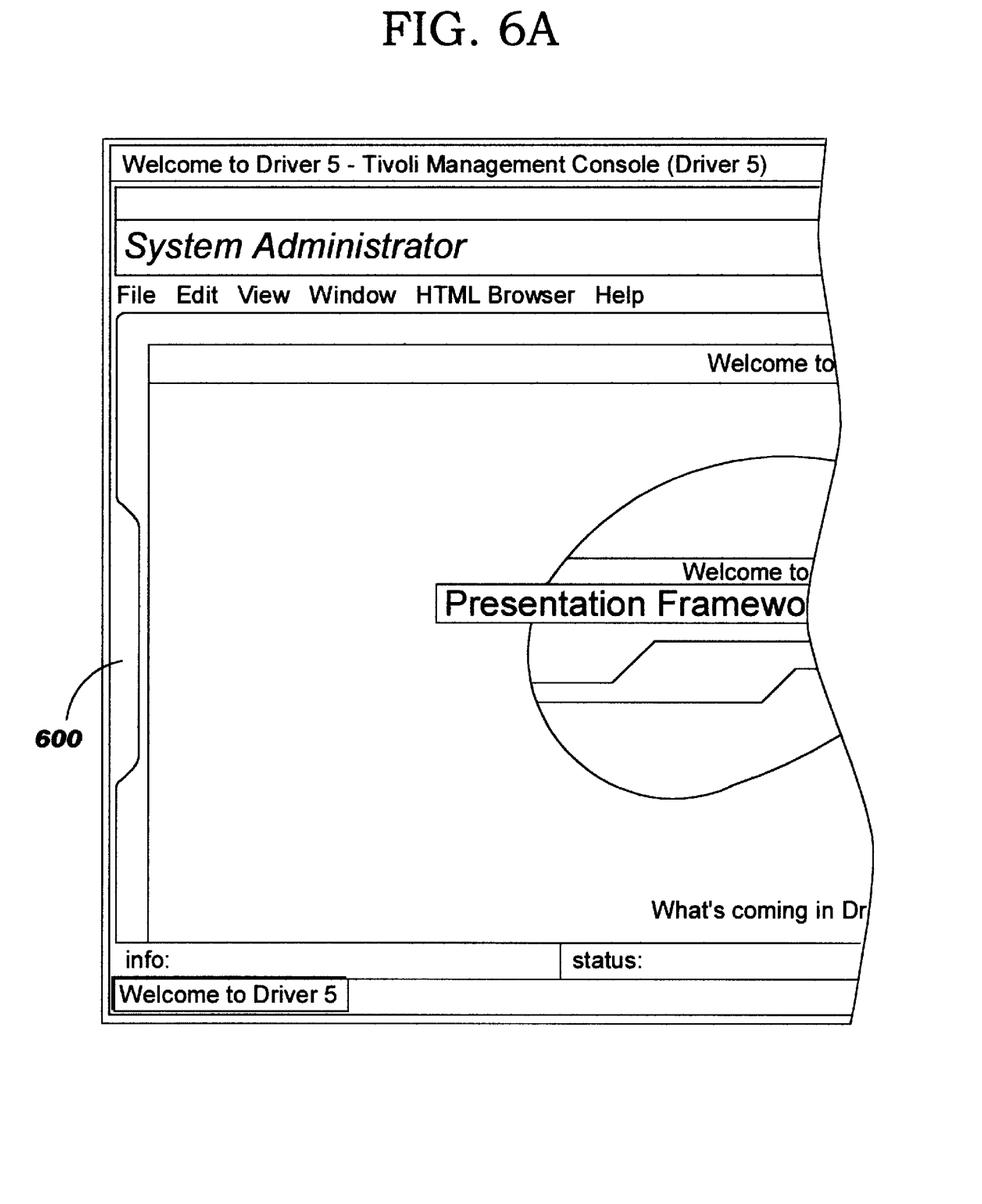
FIGS. 6A and 6B are screen captures illustrating operation according to particular embodiments of the present invention.
Figure 6B:
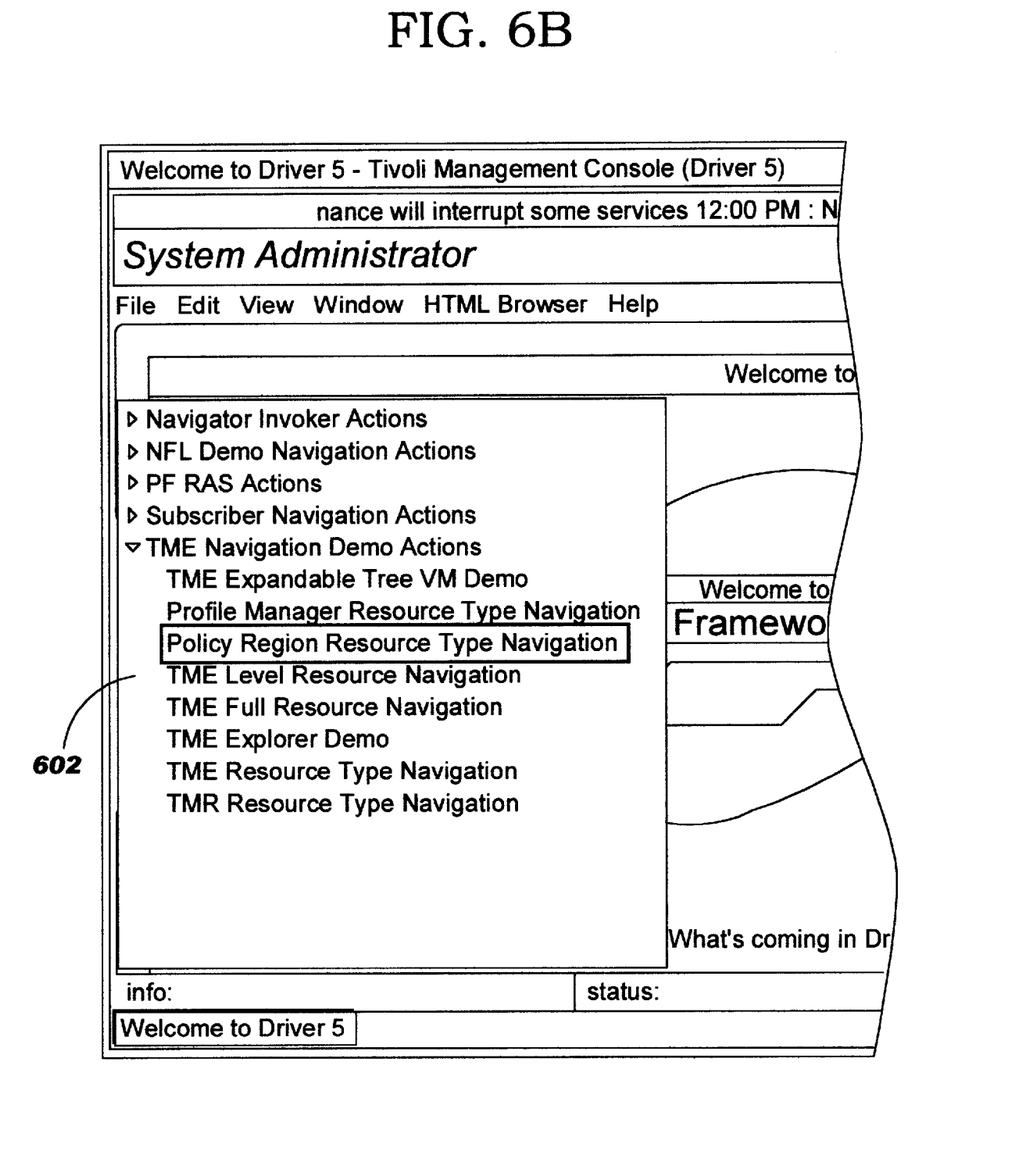

As an example of how embodiments of the present invention may provide improvements in user interfaces, FIG. 6A illustrates an exemplary portfolio. To maximize the primary work/view/content area, peripheral components of the user interface, such as the portfolio, by default are not to be locked down as an open frame/pane. Instead, the portfolio "flies out" on pointer-over events or clicks of the portfolio handle 600 and then closes after a selection is made or the pointer moves off the portfolio's area. To open the portfolio, the user may click on its handle or hover the pointer over the portfolio handle 600 for a predefined delay time. However, by reducing the delay time based on user intent, the size of the target area (portfolio's handle 600) may be decreased and the need for the user to click in order to open up the portfolio may also be decreased. FIG. 6B illustrates the portfolio after it has been opened, thereby displaying the portfolio frame 602.

The delay time utilized to open the portfolio may be reduced by determining if the user is moving the pointer toward the portfolio handle 600. If the pointer moves toward the portfolio handle at a speed of movement below a threshold and the pointer is decelerating, then it may be inferred that the user intends to stop at the portfolio handle 600 and the delay in opening the portfolio frame 602 may be reduced. This may be accomplished by reducing the delay time from the "enter" event of entering the portfolio handle 600 to the activation event which opens the portfolio frame 602. However, if the pointer movement is above the speed threshold or not decelerating, then it may be inferred that the user does not intend to stop on the portfolio handle and the delay between the "enter" event and the activation event may be either increased or maintained. Thus, the likelihood that the user would experience unintended opening of the portfolio frame 602 may be reduced while reducing the delay that a user may experience when the user wishes to open the portfolio.

Similarly, when a user moves the pointer outside the portfolio frame 602 an exit event may be generated to close the portfolio frame 602. This exit event may be delayed or prevented based on the movement characteristics of the pointer so as to reduce the likelihood of inadvertent closing of the portfolio frame 602. Such may be accomplished by evaluating the movement to determine the direction, speed and acceleration of the pointer. The exit event may be delayed or prevented unless the direction of pointer movement is away from the portfolio frame 602, the speed of pointer movement is above a certain threshold and/or the acceleration is above another threshold. Accordingly, by inferring the intent to leave the portfolio based on the characteristics of pointer movement, the user interface may reduce unintended consequences of user actions.

While, in certain embodiments of the present invention, the pointer movement may be tracked irrespective of pointer location on a display, in other embodiments of the present invention, the pointer movement may be tracked only when the pointer is within a "sensing area" associated with the user interface element. The "sensing area" may be larger than, smaller than or the same size as the user interface element. Furthermore, different user interface elements may have different sensing areas or a single user interface may have multiple sensing areas associated with different events. As such, multiple sensing areas may be provided in a single user interface. Depending on the particular implementation of the present invention, these multiple sensing areas may be handled by a single process or by multiple processes in a multi-tasking system.

Figure 8:
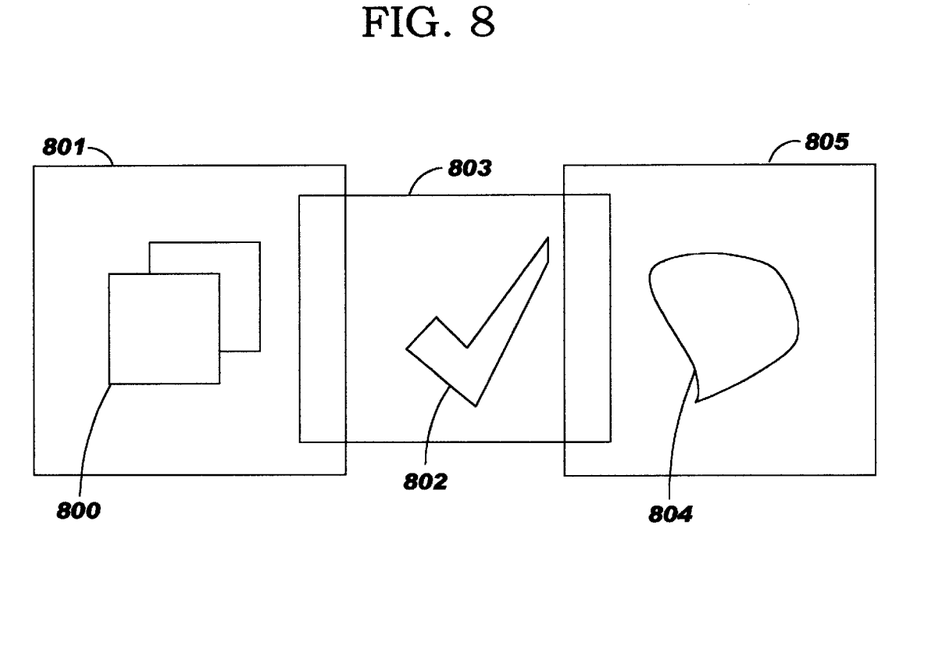
FIG. 8 is a block diagram illustrating a sensing area according to embodiments of the present invention.

An example of multiple sensing areas is illustrated in FIG. 8. As seen in FIG. 8, the user interface elements 800, 802 and 804 have corresponding sensing areas 801, 803 and 805. When a pointer is moved into the sensing area 801, movement of the pointer is tracked to adjust conditions for triggering events associated with the user interface element 800. When the pointer is moved into the sensing area 803, movement of the pointer is tracked to adjust conditions for triggering events associated with the user interface element 802. Similarly, when the pointer is moved into the sensing area 805, movement of the pointer is tracked to adjust conditions for triggering events associated with the user interface element 804. If the pointer is in both sensing areas 801 and 803, then pointer movement is tracked for both the user interface elements 800 and 802.

Furthermore, in additional embodiments of the present invention, the criteria for evaluating characteristics of movement may be dynamically established so as to allow the criteria to be tailored to a particular user. Such dynamic criteria may, for example, be provided by learning the mouse movement characteristics of a user so as to tailor threshold values or delay times associated with a user interface element. Alternatively, a user selectable "aggressiveness" criteria may be provided where the delay values and/or the movement criteria are altered based on how aggressive the user wants the system to be in inferring the intent of the user.

Figure 7:
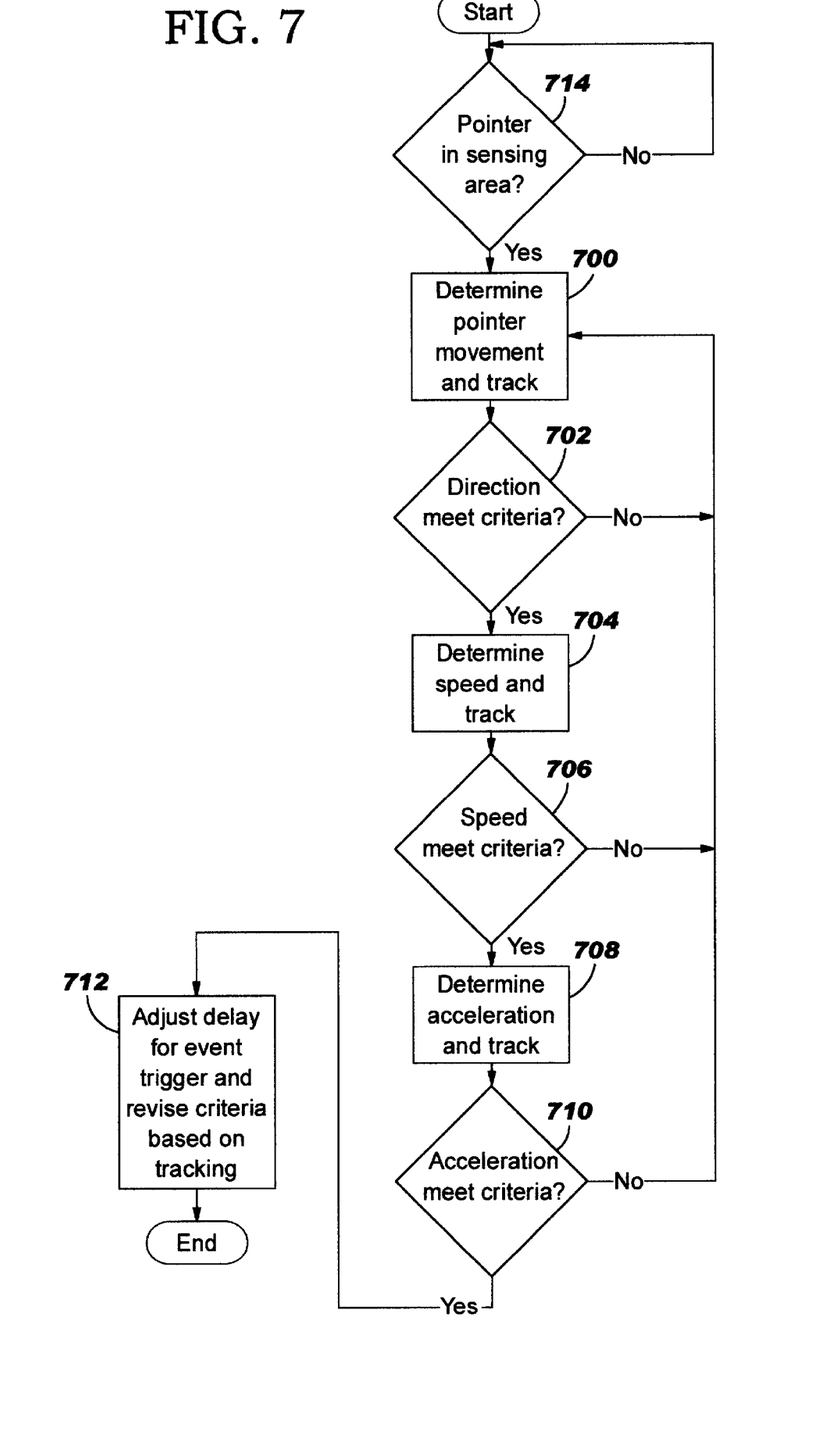
FIG. 7 is a flowchart illustrating operations according to embodiments of the present invention.

FIG. 7 illustrates operations according to embodiments of the present invention incorporating both sensing area and learning aspects of the present invention. In the embodiments illustrated in FIG. 7, the condition adjusted is a delay associated with the triggering of an event. As seen in FIG. 7, it is determined if the pointer is within a sensing area associated with a user interface element (block 714). If the pointer is not within the sensing area (block 714), then no other operations need be performed. However, when the pointer enters the sensing area (block 714), the pointer movement within the sensing area is determined and the movement tracked so as to learn the movement habits of the user (block 700). Based on the pointer movement, the direction of pointer movement may be determined and compared to a criteria (block 702). For example, the criteria may be met if the pointer is moving toward a user interface element and not met if the pointer is moving away from a user interface element. If the pointer is not moving toward the user interface element (block 702), then the criteria is not met and no change to the delay is made.

If the direction criteria is met (block 702), the speed of movement may be determined and tracked (block 704). It is determined if the speed of movement meets a speed criteria (block 706). For example, if the speed of movement is less than a predefined speed threshold, then it may be determined that the speed criteria is met (block 706). If the speed criteria is not met (block 706), then no change to the delay is made. If the speed criteria is met (block 706), the acceleration of the pointer may be determined and tracked (block 708). The acceleration may be compared to an acceleration criteria (block 710) such that no change to the delay is made if the acceleration criteria is not met. If the acceleration criteria is met (block 710), then the delay may be adjusted and the tracked direction, speed and acceleration utilized to update the criteria for evaluation (block 712). For example, it may be determined if the pointer is decelerating as it moves. If so, then the delay may be reduced to trigger the event sooner. If the deceleration threshold consistently is such that the criteria is consistently not met, then the threshold may be adjusted so as to increase the likelihood that the criteria is met. Thus, the evaluation criteria may be modified based on the historical tracking of pointer movements to refine the criteria used in inferring the intent of the user.

While the tracking operations are illustrated as part of the operations for inferring intent, such operations may be wholly or partly performed as a separate function. Thus, in embodiments where multiple movements with respect to multiple user interface elements are utilized, a global learning of pointer movement habits may be utilized to update criteria for evaluating pointer movement characteristics individually or globally.

Embodiments of the present invention have been described with reference to modifying the criteria for evaluation based on tracking of user input, however, other information may also be utilized to modify the criteria for evaluating pointer movement characteristics. For example, the predefined evaluation criteria may also be adjusted based on characteristics of the user interface element, such as the size, shape and location of the user interface element on the display. Thus, for example, in FIG. 7, an additional block may be added between blocks 714 and 700 which determined the criteria for evaluation based on characteristics of the user interface element associated with the sensing area in which the pointer was located. Such modifications may, for example, be carried out by the graphical user interface system of an operating system. Such criteria could also be adjusted by an event processing component of a graphical user interface system.

The present invention has been described with reference to specific examples of uses of the present invention. However, the present invention may be utilized for controlling events for user interface elements in other contexts. For example, other applications of embodiments of the present invention may provide for overcoming unintended pointer movement such as sometimes occurs when a pointer of, for example, a laptop, "wanders" even without user input to the pointing device. In such instances, this "wandering" could be detected based on the extremely slow movement of the pointer and ignored or delays associated with events reduced so that the wandering does not restart counters for the delays. Thus, the present invention should not be construed as limited to the particular examples described herein.

The flowcharts and block diagrams of FIGS. 1 through 3, 5 and 7 illustrate the architecture, functionality, and operation of possible implementations of systems, methods and computer program products for controlling the triggering of events associated with a user interface element according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of controlling events associated with an element of a user interface, the method comprising the steps of:

determining if a direction of movement of a pointer is away from the element;

determining a speed of the pointer;

determining an acceleration of the pointer; and increasing a delay associated with triggering the at least one event if the direction of movement is away from the element, the speed is below a predefined threshold and the acceleration of the pointer indicates that the pointer is decelerating.

2. A method according to claim 1, wherein the at least one event comprises closing a graphic user interface display window and wherein the element comprises a close selection button.

3. A method according to claim 1, wherein at least one of the step of determining a direction of movement of the pointer, determining a speed of the pointer and determining an acceleration of the pointer are only carried out if one or more of the direction of movement of the pointer is away from the element, the speed of the pointer is below the predefined threshold and the acceleration of the pointer is decelerating.

4. A method according to claim 3, wherein the step of determining a speed of the pointer is only carried out if the direction of movement of the pointer is away from the element and the step of determining an acceleration of the pointer is only carried out if the speed of the pointer is below the predefined threshold.

5. A method according to claim 3, further comprising the steps of:

defining a region of a display associated with the element; and determining if the pointer is within the defined region; and wherein the steps of determining a direction of movement of the pointer, determining a speed of the pointer and determining an acceleration of the pointer are only carried out if the pointer is within the defined region.

6. A method of controlling events associated with an element of a user interface, the method comprising the steps of:

determining at least one characteristic of pointer movement of a pointing device;

evaluating the characteristic of pointer movement based on a predefined evaluation criteria;

adjusting at least one condition for triggering at least one event associated with the element if the predefined evaluation criteria is met;

controlling the triggering of the at least one event utilizing the adjusted condition;

tracking pointer movement so as to establish a history of pointer movement; and revising the predefined evaluation criteria based on the history of pointer movement so as to dynamically update the predefined evaluation criteria to reflect the history of pointer movement.

7. A method of controlling events associated with an element of a user interface, the method comprising the steps of:

determining at least one characteristic of pointer movement of a pointing device;

evaluating the characteristic of pointer movement based on a predefined evaluation criteria;

adjusting at least one condition for triggering at least one event associated with the element if the predefined evaluation criteria is met;

controlling the triggering of the at least one event utilizing the adjusted condition; and adjusting the predefined evaluation criteria based on characteristics of the user interface element.

8. A method according to claim 7, wherein the characteristics of the user interface element comprise at least one of size of the user interface element, shape of the user interface element and location of the user interface element on the display.

9. A system for controlling events associated with an element of a user interface, comprising:

means for determining if a direction of movement of a pointer is away from the element;

means for determining a speed of the pointer;

means for determining an acceleration of the pointer; and means for increasing a delay associated with triggering at least one event if the direction of movement is away from the element, the speed is below a predefined threshold and the acceleration of the pointer indicates that the pointer is decelerating.

10. A system according to claim 9, wherein the at least one event comprises closing a graphic user interface display window and wherein the element comprises a close selection button.

11. A system according to claim 9, wherein at least one of the means for determining a direction of movement of the pointer, means for determining a speed of the pointer and means for determining an acceleration of the pointer only determine a direction, speed or acceleration if one or more of the direction of movement of the pointer is away from the element, the speed of the pointer is below the predefined threshold and the acceleration of the pointer is decelerating.

12. A system according to claim 11, wherein the means for determining a speed of the pointer is only determines a speed if the direction of movement of the pointer is away from the element and the means for determining an acceleration of the pointer only determines an acceleration if the speed of the pointer is below the predefined threshold.

13. A system according to claim 11, further comprising:

means for defining a region of a display associated with the element; and means for determining if the pointer is within the defined region; and wherein the means for determining a direction of movement of the pointer, means for determining a speed of the pointer and means for determining an acceleration of the pointer only determine a direction, speed or acceleration if the pointer is within the defined region.

14. A system for controlling events associated with an element of a user interface, comprising:

means for determining at least one characteristic of pointer movement of a pointing device;

means for evaluating the characteristic of pointer movement based on a predefined evaluation criteria;

means for adjusting at least one condition for triggering at least one event associated with the element if the predefined evaluation criteria is met;

means for controlling the triggering of the at least one event utilizing the adjusted condition;

means for tracking pointer movement so as to establish a history of pointer movement; and means for revising the predefined evaluation criteria based on the history of pointer movement so as to dynamically update the predefined evaluation criteria to reflect the history of pointer movement.

15. A system for controlling events associated with an element of a user interface, comprising:

means for determining at least one characteristic of pointer movement of a pointing device;

means for evaluating the characteristic of pointer movement based on a predefined evaluation criteria;

means for adjusting at least one condition for triggering at least one event associated with the element if the predefined evaluation criteria is met;

means for controlling the triggering of the at least one event utilizing the adjusted condition; and means for adjusting the predefined evaluation criteria based on characteristics of the user interface element.

16. A system according to claim 15, wherein the characteristics of the user interface element comprise at least one of size of the user interface element, shape of the user interface element and location of the user interface element on the display.

17. A computer program product for controlling events associated with an element of a user interface, comprising:

a computer readable medium having computer readable program code embodied therein, the computer readable program code comprising:

computer readable program code which determines if a direction of movement of a pointer is away from the element;

computer readable program code which determines a speed of the pointer;

computer readable program code which determines an acceleration of the pointer; and computer readable program code which increases a delay associated with triggering at least one event if the direction of movement is away from the element, the speed is below a predefined threshold and the acceleration of the pointer indicates that the pointer is decelerating.

18. A computer program product according to claim 17, wherein the at least one event comprises closing a graphic user interface display window and wherein the element comprises a close selection button.

19. A computer program product according to claim 17, wherein at least one of the computer readable program code which determines a direction of movement of the pointer, computer readable program code which determines a speed of the pointer and computer readable program code which determines an acceleration of the pointer only determine a direction, speed or acceleration if one or more of the direction of movement of the pointer is away from the element, the speed of the pointer is below the predefined threshold and the acceleration of the pointer is decelerating.

20. A computer program product according to claim 19, wherein the computer readable program code which determines a speed of the pointer is only determines a speed if the direction of movement of the pointer is away from the element and the computer readable program code which determines an acceleration of the pointer only determines an acceleration if the speed of the pointer is below the predefined threshold.

21. A computer program product according to claim 19, further comprising:

computer readable program code which defines a region of a display associated with the element; and computer readable program code which determines if the pointer is within the defined region; and wherein the computer readable program code which determines a direction of movement of the pointer, computer readable program code which determines a speed of the pointer and computer readable program code which determines an acceleration of the pointer only determine a direction, speed or acceleration if the pointer is within the defined region.

22. A computer program product for controlling events associated with an element of a user interface, comprising:

a computer readable medium having computer readable program code embodied therein, the computer readable program code comprising:

computer readable program code which determines at least one characteristic of pointer movement of a pointing device;

computer readable program code which evaluates the characteristic of pointer movement based on a predefined evaluation criteria;

computer readable program code which adjusts at least one condition for triggering at least one event associated with the element if the predetermined evaluation criteria is met;

computer readable program code which controls the triggering of the at least one event utilizing the adjusted condition;

computer readable program code which tracks pointer movement so as to establish a history of pointer movement; and computer readable program code which revises the predefined evaluation criteria based on the history of pointer movement so as to dynamically update the predefined evaluation criteria to reflect the history of pointer movement.

23. A computer program product for controlling events associated with an element of a user interface, comprising:

a computer readable medium having computer readable program code embodied therein, the computer readable program code comprising:

computer readable program code which determines at least one characteristic of pointer movement of a pointing device;

computer readable program code which evaluates the characteristic of pointer movement based on a predefined evaluation criteria;

computer readable program code which adjusts at least one condition for triggering at least one event associated with the element if the predetermined evaluation criteria is met;

computer readable program code which controls the triggering of the at least one event utilizing the adjusted condition; and computer readable program code which adjusts the predefined evaluation criteria based on characteristics of the user interface element.

24. A computer program product according to claim 23, wherein the characteristics of the user interface element comprise at least one of size of the user interface element, shape of the user interface element and location of the user interface element on the display.

\* \* \* \* \*